(12) United States Patent
Liinamaa et al.

(10) Patent No.: US 6,289,093 B1
(45) Date of Patent: Sep. 11, 2001

(54) PROCEDURE FOR CASCADING V5 INTERFACES

(75) Inventors: Olli Liinamaa, Oulu; Jarmo Haukilahti, Espoo; Seppo Vehmer, Vantaa, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/497,246

(22) Filed: Feb. 3, 2000

Related U.S. Application Data

(63) Continuation of application No. PCT/FI98/00619, filed on Aug. 7, 1998.

(30) Foreign Application Priority Data

Aug. 12, 1997 (FI) .......................................................... 973313

(51) Int. Cl.$^7$ .................................................. H04M 7/00
(52) U.S. Cl. ......................... 379/219; 379/220; 379/229
(58) Field of Search .................................. 379/198, 207, 379/219, 229, 230, 399, 269, 272

(56) References Cited

U.S. PATENT DOCUMENTS

| | | | | |
|---|---|---|---|---|
| 5,781,623 | * | 7/1998 | Khakzar | 379/230 |
| 5,822,420 | * | 10/1998 | Bolon et al. | 379/230 |
| 5,910,980 | * | 6/1999 | Ogasawara et al. | 379/142 |

FOREIGN PATENT DOCUMENTS

| | | |
|---|---|---|
| 195 16 516 | 11/1996 | (DE) . |
| 195 24 029 | 11/1996 | (DE) . |
| 297 04 615 | 6/1997 | (DE) . |
| 0 730 389 | 6/1996 | (EP) . |
| 0 731 618 | 9/1996 | (EP) . |
| 921035 | 9/1993 | (FI) . |
| 973313 | 3/1997 | (FI) . |
| 97/16936 | 5/1997 | (WO) . |

OTHER PUBLICATIONS

9/94, ETS 300 347–1 Signalling Protocols and Switching (SPS); V interfaces at the digital Local Exchange (LE) V5.2 interface for the support of Access Network (AN) Part 1: V5.2 interface specification.

2/94, ETS 300 324–1 Signalling Protocols and Switching (SPS); V interfaces at the digital Local Exchange (LE) V5.1 interface for the support of Access Network (AN) Part 1: V5.1 interface specification.

2/99, International Search Report for PCT/FI98/00619.

1994, "V5 Interfaces between Digital Local Exchanges and Access Networks" Khakzar, pp. 44–50.

* cited by examiner

Primary Examiner—Ahmad Matar
Assistant Examiner—Bing Bui
(74) Attorney, Agent, or Firm—Altera Law Group, LLC

(57) ABSTRACT

Procedure for connecting a subscriber to a telephone exchange in a data communication system comprising a telephone exchange (LE) with a number of subscribers defined in it, an access network (AN) connected to the telephone exchange via a first V5 interface (V5) and comprising a first access node (AN1), a second access node (AN2), which is connected to the telephone exchange, and a subscriber terminal (TE), which is connected to the local exchange via the access network and/or a concentrator. According to the invention, the second access node (AN2) is connected to the first access node (AN1) via a second V5 interface, the connection between the subscriber and the telephone exchange (LE) being this set up by cascading two V5 interfaces.

14 Claims, 4 Drawing Sheets

PROCEDURE FOR CASCADING V5 INTERFACES

This application is a continuation of PCT/FI98/00619 filed Aug. 7, 1998.

FIELD OF THE INVENTION

The present invention relates to a method for cascading V5 interfaces.

V5 interface standards ETS 300 324 and ETS 300 347 describe an interface between a local exchange and an access network and the functionality in each network element. The access network is the part of a local area network that contains the subscriber's lines. Thus, subscribers and subscriber's lines can be connected to the exchange either directly (direct subscribers) or via various multiplexers and/or concentrators. V5 interfaces enable subscribers belonging to a physically separate access network to be connected to a local exchange using a standard interface.

A dynamic concentrator interface (V5.2) as defined in the ETS 300 347 standard series consists of one or more (1–16) PCM (Pulse Code Modulation) lines. One PCM line comprises 32 channels, each of which with a transfer rate of 64 kbit/s, i.e. 2048 kbit/s altogether. The V5.2 interface supports analogue telephones as used in the public telephone network, digital, such as ISDN (Integrated Services Digital Network) basic and system subscriber lines as well as other analogue or digital terminal equipment based on semi-fixed connections.

A static V5.1 multiplexer interface consists of one 2048 kbit/s PCM line. The V5.1 interface supports the same subscriber types as the V5.2 interface except ISDN system lines.

Terminal equipment can be connected to the subscriber ports of the access node. One access node may have one or more V5 interfaces connected to it. Subscriber ports are created in the V5.1 interface by associating an unambiguous address of each subscriber port with a given address in the V5.1 interface. In the local exchange, this address is created as a V5 subscriber. In other words, each subscriber port has an unambiguous address which is coupled with a V5.1 interface address and which uses a certain time slot (analogue subscribers) or certain time slots (ISDN subscribers) for communication with the local exchange. In the V5.2 interface, too, each subscriber port has an unambiguous address, but the signalling to the local exchange is implemented using a dynamically allocated time slot/dynamically allocated time slots. This means that the BCC (Bearer Channel Control) protocol consistent with the V5 standard allocates the time slots to be used separately for each call.

V5 standardisation aims at creating an open interface for use between a local exchange and an access network. However, no interface for use between the access node and the subscribers within the access network has been defined. Therefore, problems are encountered in connecting subscribers to the access node e.g. via a static concentrator interface. A further problem is that, especially in an environment with multiple suppliers, the solutions of different suppliers for concentrating subscribers in an access network differ significantly from each other, which means that operators do not necessarily have enough choice options regarding suppliers of equipment.

SUMMARY OF THE INVENTION

The object of the present invention is to eliminate the problems described above.

A specific object of the present invention is to disclose a new type of procedure in a data communication system using known and supported standard solutions for cascading V5 interfaces as defined in the above-mentioned standards and for connecting subscribers to an access node. A further object of the invention is to eliminate supplier-specific solutions between subscriber and access node.

As for the features characteristic of the invention, reference is made to the claims.

The procedure of the invention for connecting a subscriber to a telephone network can be implemented e.g. in a data communication system comprising a telephone exchange and a number of subscribers defined in it. Further, the data communication system comprises an access network connected to the telephone exchange via a first V5 interface and comprising a first access node and a second access node. The V5 interface is preferably either a V5.1 or a V5.2 interface consistent with the above-mentioned standards. The second access node is preferably a switching stage through which a number of interconnecting feeders or subscriber lines carrying a relatively light traffic can be connected to a few lines carrying larger amounts of traffic. Using a subscriber terminal connected to the local exchange via the access network and/or directly via the second access node, connections are set up to other subscriber terminals or network elements.

According to the invention, the second access node is connected to the first access node via a second V5 interface, the connection between the subscriber or subscriber terminal and the telephone exchange being thus set up by cascading two V5 interfaces. In a preferred case, the first V5 interface is a standard V5.2 interface and the second V5 interface is a standard V5.1 interface.

As compared with prior art, the invention has the advantage that it makes it possible to create access networks using network components manufactured by any manufacturer. In particular, a V5 interface can be used both between the second access node and the first access node and between the first access node and the local exchange.

A further advantage of the invention is that, since according to the V5 definitions the first access node can be connected to two or more local exchanges e.g. via a V5.2 interface, the invention significantly facilitates the handover of subscribers from one local exchange to another local exchange.

Moreover, the invention allows the second access node to be easily connected to the local exchange using a V5 interface either via a first access node supporting the V5 interface or directly via a V5.1 interface.

The protocols common to the first and second V5 interfaces are controlled in the first access node either by a common Control and PSTN protocol object or by separate Control and PSTN protocol objects of each interface. In a preferred case, the protocols to be used in the first V5 interface, such as BCC, Link Control and Protection protocol, are determined in the first access node.

In an embodiment of the present invention, in conjunction with the creation of the second V5 interface, interface parameters are defined for it, said parameters comprising an interface identifier, interface type, identifier of the physical connection to be used, i.e. the number or equivalent of the PCM line, and the voice time slots to be used in the interface. In addition, the Control protocol of the V5 definitions is assigned to time slot 16. The first and second V5 interfaces are preferably activated independently in accordance with the V5 definitions.

In a preferred embodiment of the present invention, the PSTN signalling between the first and second V5 interfaces is signalled without L3-layer processing consistent with the V5 definitions. This provides the advantage that the first access node will have no need to know anything about national PSTN settings (PSTN mapping), so the implementation becomes considerably simpler.

BRIEF DESCRIPTION OF THE DRAWINGS

In the following, the invention will be described in detail by the aid of a few examples of its embodiments by referring to the attached drawing, in which.

DETAILED DESCRIPTION OF THE INVENTION

Figure 1:
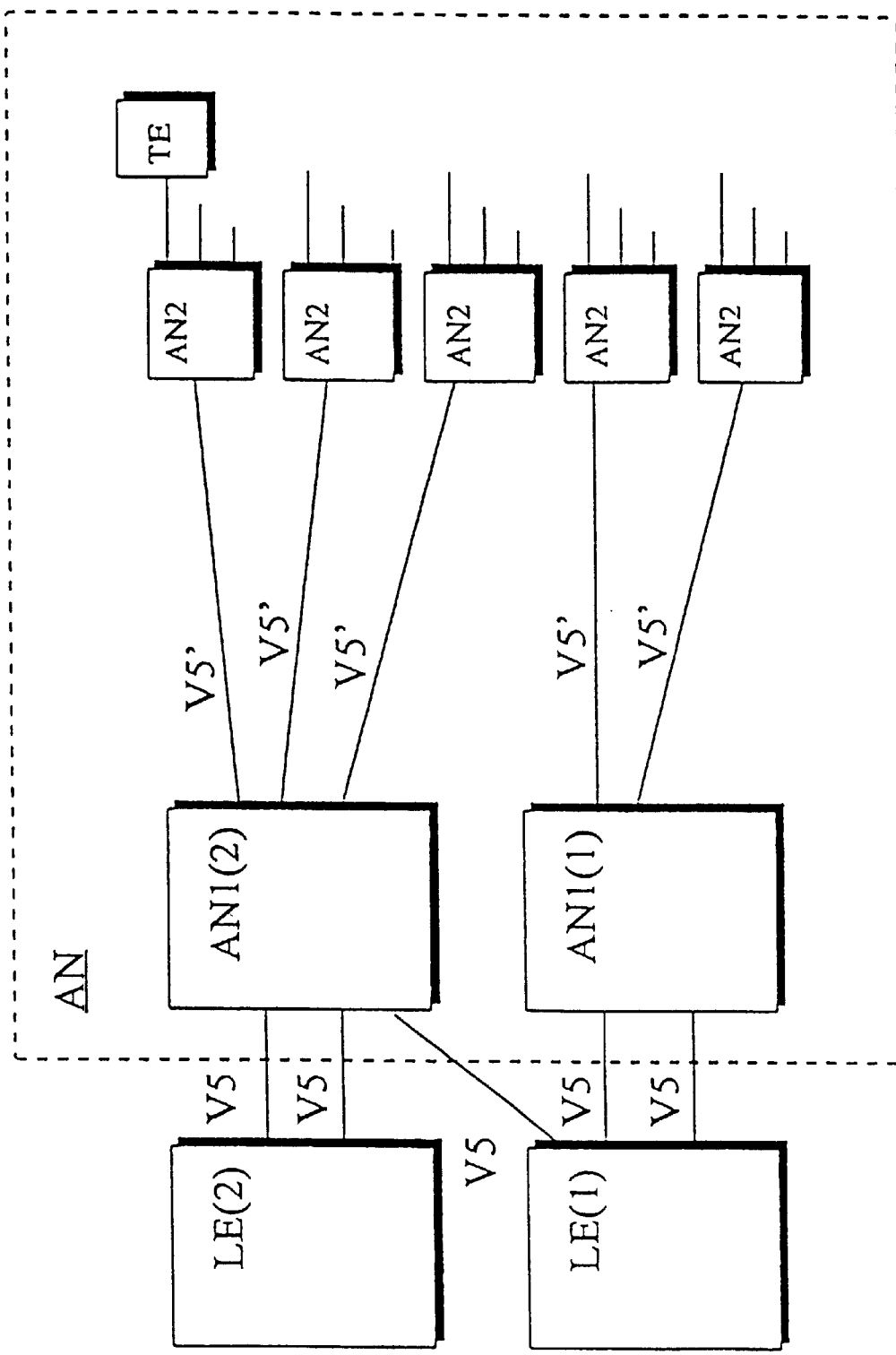
FIG. 1 presents a data communication system preferable for the procedure of the invention.

The data communication system presented in FIG. 1 comprises two local exchanges LE(1), LE(2) and access nodes AN1(1), AN1(2) respectively connected to the local exchanges. In this example, the access nodes are connected to the local exchanges via V5.2 interfaces V5. As shown in the figure, one access node AN1 can be connected to several local exchanges, thus allowing a subscriber to be handed over to another local exchange by operation control commands in the local exchange. Moreover, the system comprises a number of second access nodes or multiplexers AN2, which are connected to a local exchange LE via access nodes AN1. The multiplexer AN2 is connected to the access node AN1 via a second V5 interface, which is a V5.1 interface V5'. Further, in the example in FIG. 1, the subscriber terminal TE is connected to a local exchange via a multiplexer AN2 and a first access node AN1. The access network AN consists of the subscriber terminal equipment TE, the multiplexer AN2, the first access node AN1 and the lines connecting them.

The V5 interfaces presented in the data communication system depicted in FIG. 1 are activated independently of each other. The interfaces are preferably activated in accordance with the normal V5 definitions. Let it be further stated that, in the system illustrated by FIG. 1, it is possible to implement a so-called management network, which is connected to the local exchange LE and to the first and second access nodes AN1 and AN2. However, the structure and function of the management network will not be described here in detail, but reference is made to the V5 standards.

Figure 2A:
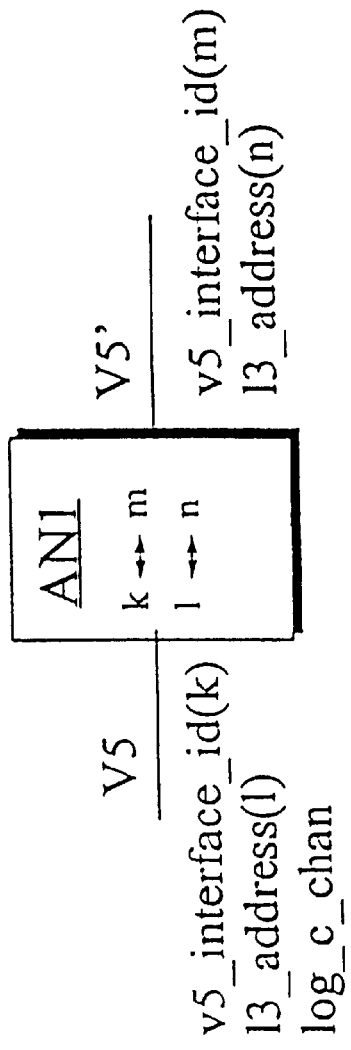
FIGS. 2a–2c are diagrams illustrating the parameter conversions carried out in an access node.
Figure 2B:
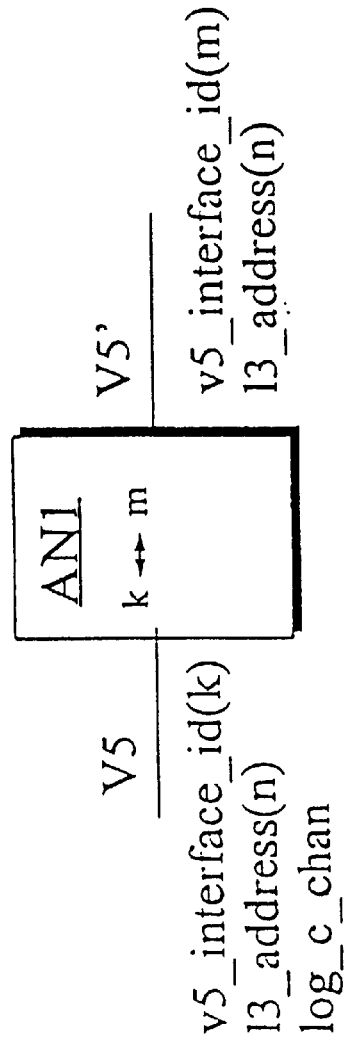
Figure 2C:
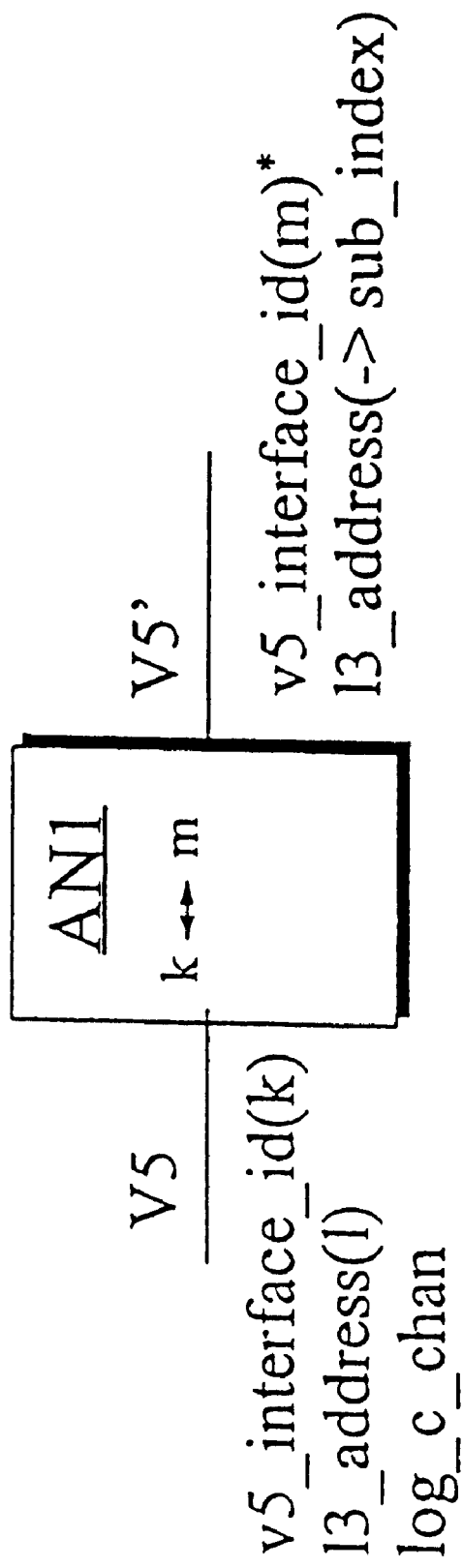

Referring to FIGS. 2a–2c, the data to be defined for the V5 interfaces in connection with their creation will now be discussed in more detail. For the first V5 interface V5, an interface identifier v5_interface_id, an identifier pcm_ information for the interconnecting feeder used by the interface and the c-channels comprised in the interface must be defined. For the second V5 interface, in addition to the parameters mentioned above, it is necessary to define the b-channels which are permanently assigned to the subscribers who use the interface.

When the access network is activated, all the V5 interfaces will be activated. Each V5 interface is started independently, and the activation of one V5 interface has no effect on the activation of the other interfaces. Therefore, the activation of the interfaces need not necessarily be synchronised with each other. Thus, the V5.1 interfaces V5' can be treated in the same way as the subscriber modules are treated in the first access node AN1. The main idea in the activation of a cascaded V5 interface according to the invention is that both V5 interfaces in the cascaded V5 interface, see FIG. 1, are initialised independently and that all subscribers are initialised in blocked state.

In the activation of a V5.1 interface V5' connected to the access node, three main operations can be distinguished: activation of the data links, PSTN restart and blocking/unblocking of subscribers. The V5.1 interface can carry out all the above-mentioned operations independently. It can activate its own data links even if none of the V5.2 interfaces between the first access node AN1 and the local exchange has been activated. Likewise, the PSTN restart can be performed in the second V5.1 interface V5' without the V5.2 interfaces. When the V5.1 interface V5' blocks/unblocks the subscribers before any one of the V5.2 interfaces has been started, all subscribers can be unblocked via the interface in question. When one of the V5.2 interfaces finally reaches this stage of the starting procedure, it will unblock all subscribers that have been unblocked in the V5.1 interface. On the other hand, if one of the V5.1 interfaces is started after the activation of the V5.2 interfaces, then all subscribers configured in this V5.1 interface will be in the blocked state in the V5.2 interface until the V5.1 interface finishes its starting procedure and unblocks the subscribers.

If the local exchange LE wants to block a subscriber, it will send a blocking command and the subscriber will be blocked via the V5.2 interface V5. However, it may be possible to keep this given subscriber in the active state in the V5.1 interface V5' even if the local exchange LE should block the subscriber. In this case, the local exchange LE must take care of unblocking the subscriber in the V5.2 interface V5.

If the second access node AN2 blocks a subscriber by sending a blocking command, then the subscriber will be blocked in both the V5.2 and in the V5.1 interface. In this case, the second access node AN2 must take care of unblocking the subscriber in the V5.1 interface V5', which again starts the unblocking procedure in the V5.2 interface V5.

Figure 3:
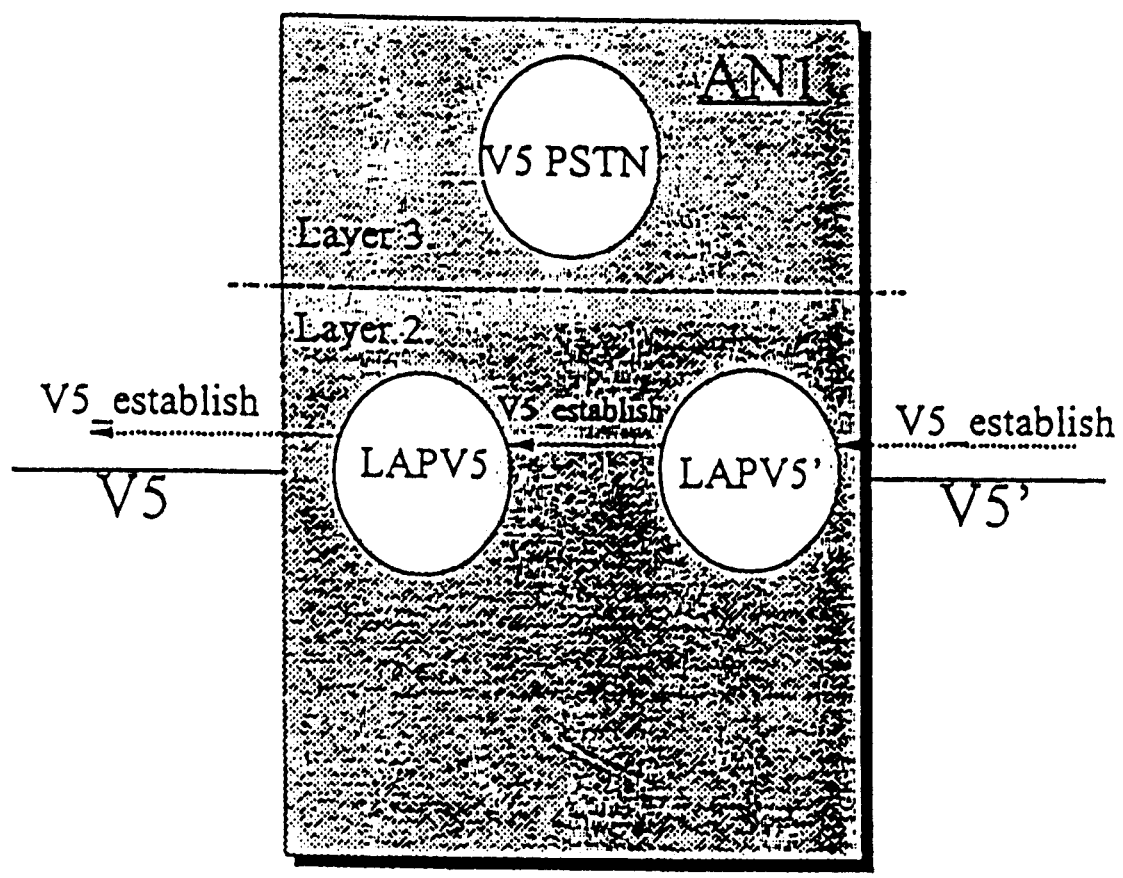
FIG. 3 represents the access node signalling in different layers.

Referring to FIG. 3, let it be further stated that some of the V5 protocols must be determined in the first access node AN1 because they are only used in the first V5 interface V5. These protocols, consistent with the V5 definitions, are the BCC (Bearer Channel Protocol) protocol, the Link protocol and the Protection protocol. In addition, the PSTN signalling can be carried out transparently (i.e. without $3^{rd}$ layer processing) in the first access node AN1. When a PSTN message is received from the second V5 interface V5', it will be transmitted transparently to the first V5 interface V5 and vice versa by using LAPV5 signalling. Thus, no national settings of PSTN signalling need to be known in the access node.

The invention is not restricted to the examples of its embodiments described above, but many variations are possible within the scope of the inventive idea defined by the claims.

What is claimed is:

1. A method for connecting a subscriber to a telephone exchange in a data communication system comprising:

predefining a telephone exchange with a number of subscribers in it, connecting an access network (AN) to the telephone exchange via a first V5 interface wherein a first access node, a second access node, which is connected to the telephone exchange, and a subscriber terminal, is connected to the local exchange via the access network or a concentrator, and wherein the second access node is connected to the first access node via a second V5 interface, and connecting the subscriber and the telephone exchange cascading two V5 interfaces.

2. The method as defined in claim 1, wherein, in conjunction with the creation of the second V5 interface (V5'), interface parameters are defined for it, said parameters comprising an interface identifier, interface type, identifier of the physical connection to be used, and time slots to be used in the interface.

3. The method as defined in claim 1 wherein a Control protocol of V5 definitions is assigned to time slot 16.

4. The method as defined in claim 1, wherein the first and second V5 interfaces are started independently in accordance with V5 definitions.

5. The method as defined in claim 1, wherein protocols common to the first and second V5 interfaces are controlled in the first access node AN1.

6. The method as defined in claim 1, wherein protocols to be used in the first V5 interfaces are determined in the first access node.

7. The method as defined in claim 1, wherein the PSTN signalling between the first and second V5 interfaces is signalled without L3-layer processing consistent with V5 definitions.

8. The method as defined in claim 1, wherein the interface between the access network (AN) and the telephone exchange (LE) is a V5.2 interface and the V5 interface between the second access node and the first access node is a V5.1 interface.

9. A method for connecting a subscriber to a telephone exchange in a data communication system comprising:

predefining a telephone exchange with a number of subscribers in it, connecting an access network (AN) to the telephone exchange via a first V5 interface wherein a first access node, a second access node, which is connected to the telephone exchange, and a subscriber terminal, is connected to the local exchange via the access network or a concentrator, and wherein the second access node is connected to the first access node via a second V5 interface, connecting the subscriber and the telephone exchange by cascading two V5 interfaces, wherein the protocols common to the first and second V5 interfaces are controlled in the first access node and the protocols to be used in the first V5 interface are determined in the first access node.

10. The method as defined in claim 9, wherein, in conjunction with the creation of the second V5 interface, interface parameters are defined for it, said parameters comprising an interface identifier, interface type, identifier of the physical connection to be used, and time slots to be used in the interface.

11. The method as defined in claim 9, wherein a Control protocol of V5 definitions is assigned to time slot 16.

12. The method as defined in claim 9, wherein the first and second V5 interfaces are started independently in accordance with V5 definitions.

13. The method as defined in claim 9, wherein PSTN signalling between the first and second V5 interfaces is signalled without L3-layer processing consistent with V5 definitions.

14. The method as defined in claim 9, wherein the interface between the access network (AN) and the telephone exchange is a V5.2 interface and the V5 interface between the second access node and the first access node is a V5.1 interface.

* * * * *